Figure 2:
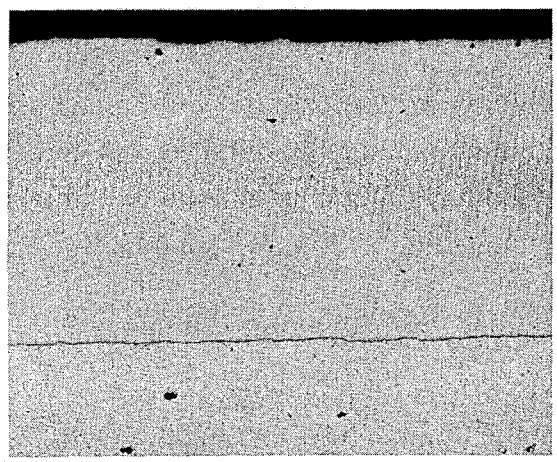

Oct. 12, 1965   J. B. ULAM   3,210,840
STAINLESS STEEL CLAD ALUMINUM AND METHODS OF MAKING SAME
Filed Aug. 8, 1961   2 Sheets-Sheet 1
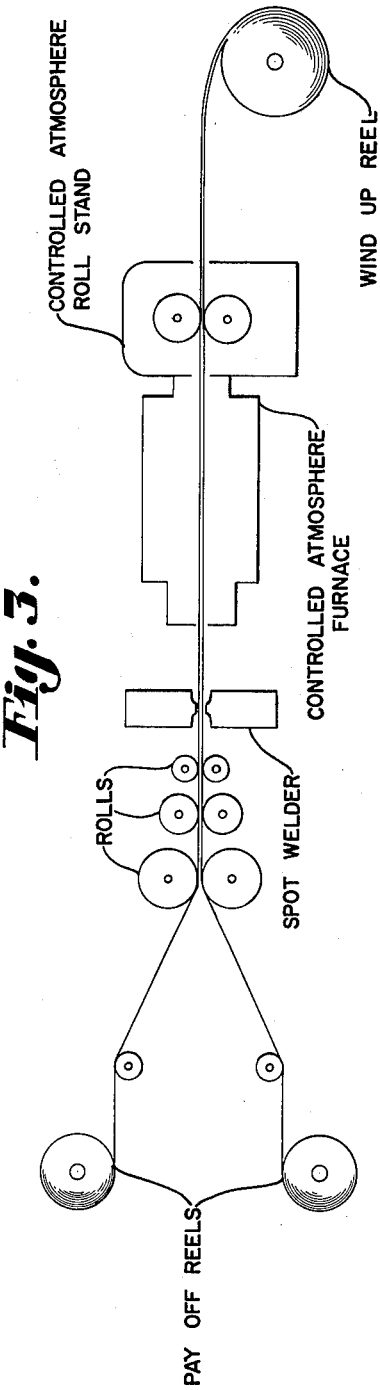
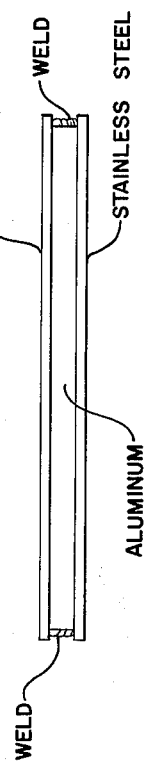
INVENTOR
JOHN B. ULAM Oct. 12, 1965 J. B. ULAM 3,210,840
STAINLESS STEEL CLAD ALUMINUM AND METHODS OF MAKING SAME
Filed Aug. 8, 1961 2 Sheets-Sheet 2

United States Patent Office 3,210,840
Patented Oct. 12, 1965

3,210,840
STAINLESS STEEL CLAD ALUMINUM AND
METHODS OF MAKING SAME
John B. Ulam, Canonsburg, Pa., assignor to Composite
Metal Products, Inc., a corporation of Pennsylvania
Filed Aug. 8, 1961, Ser. No. 130,181
8 Claims. (Cl. 29—488)

This invention relates to stainless steel clad aluminum and to methods of making stainless steel clad aluminum.

The manufacture of clad metals is not new. There have been many processes developed for the cladding of a variety of metals with other dissimilar metals. For example, my Patents No. 2,718,690 and No. 2,758,368 relate generally to methods of cladding one metal with a dissimilar metal. The problems of cladding aluminum with stainless steel have, however, remained unsolved due in large measure to the dissimilarities between aluminum and stainless steel and particularly to the considerable differences in hardening qualities and oxidation rates.

Stainless steel clad aluminum is highly desirable for a variety of services where lightweight corrosion resistant metals having a tough skin is desired. For example, such materials are highly desirable for cooking ware or aircraft and missile applications and the like.

As I have already stated, the great difference in melting points, the rapid recovery of oxide production on the surfaces and the vast spread in the mechanical and physical characteristics of aluminum and stainless steel has virtually blocked the production of such a composite metal.

I have found that such a stainless steel clad aluminum may be produced provided certain conditions are observed and carried out throughout the processes.

I have found that solders, fluxes or brazing materials do not produce a satisfactory clad metal and that poor bond strength and complete lack of formability results when any metal additives are used at the bond unless the particular method of the present application is followed. Such materials, I have found, are not essential and are generally undesirable for the reason that they appear to diffuse into the aluminum or stainless to too great a degree creating a brittle bond. I have found that too much diffusion in the case of stainless clad aluminum is the source of many of the problems of the past. My practice is intended to and does produce a controlled diffusion at the bond. The practice of my invention can perhaps be best understood by reference to the following example.

EXAMPLE

Two pieces of aluminum 0.125" x 24" x 60" in the annealed condition and one or two pieces of austenitic stainless steel 0.010" x 23" x 58", are mechanically cleaned to remove all oxides and expose the pure crystalline or lattice structure on one side only of each of the components. I then place one aluminum or aluminum alloy piece with the cleaned surface facing upward and then place one stainless layer on top with its cleaned surface down, facing the clean face of the aluminum. The second piece of mechanically cleaned stainless is placed on top of the other stainless cladding with its mechanically cleaned face upward. I then place the second mechanically cleaned aluminum sheet with its cleaned face downward in contact with the cleaned surface of the stainless steel. I then resistance or torch weld the ends of the stack together to hold the components in place. The pack is then heated to at least the recrystallization temperature of aluminum (650° to 1100° F.) in a vacuum or in an inert atmosphere previously described, then rolled to a 25 percent reduction to produce an 0.101" thick composite. Additional rolling passes or pressure is not required but may be used when rolling packs or single assemblies. The cleaned stacked components are reduced only from 10 to 35 percent to obtain the bond. The reduction may be by rolling, forging, pressing or other metal forming technique. Greater reduction during the application of pressure effects considerable work hardening into the stainless steel component. Since all hot work in the manufacture of a composite of stainless steel and aluminum is accomplished below the recrystallization temperature of the stainless steel, it then is subjected to one of its inherent characteristics which is work hardening. To produce a composite product capable of being further fabricated, such as by deep drawing, the hardening characteristic must be kept to a minimum. I have found that a reduction of 10 to 35 percent should not be exceeded unless the composite is to be used for structural applications.

FIGURE 1 illustrates a pack made in this manner. However, it should be noted that it is not necessary to make a 4-ply assembly for manufacturing of the product; a 2-ply pack may suffice. Tack or spot welds join the edges of the aluminum which overhangs the stainless steel by approximately the diameter of the spot weld. If the stainless and aluminum are of the same external dimensions tack welds can be used on the sides and ends to stabilize the pack for proper handling.

The importance of the pack construction, exact heating temperature and rolling pressure cannot be stressed too much in my process. Note should be taken of FIGURE 2 showing the microstructure of the bond with minimum interalloying. This ductile, strong bond can be formed into cooking vessels without difficulty.

FIGURE 3 illustrates the continuous rolling of stainless steel clad aluminum either single or double armor. Another example of my invention is the use of coils of stainless steel and aluminum to manufacture coils of the composite metal. Coils of stainless steel are subjected to cleaning by either mechanically removing the surface to expose the pure cleaned molecular grain or lattice structure or by cleaning that would result from mechanically reducing the stainless steel and then cleaning by annealing in an inert atmosphere or by normal cleaning practices of the steel industry. The aluminum is mechanically cleaned by any of the methods described and then brought into contact with the cleaned stainless steel, heated in one or separate furnaces to a temperature at least that required to recrystallize the aluminum and then subjecting the components to 10 to 35 percent reduction by applying pressure such as by rolling, pressing, forging, etc.

The coils of stainless steel and aluminum are either precleaned or cleaned in the cladding process to remove all contaminates and oxides and expose the completely pure molecular or lattice surface ready for heating and bonding. The two, three, or four strands or coils of stainless steel and aluminum are brought into intimate contact after the thorough cleaning operation by pinch rolls and if necessary the components are spot welded together to hold them in aligned relation during heating in a vacuum, or inert atmosphere to retain their oxide free surface prior to application of pressure. The coils of stainless steel and aluminum are fed into either separate or the same furnace by driven pinch rolls where the strands are heated between 650° to 1100° F. while maintaining the completely cleaned molecular surface during heating and subsequent pressure application for bonding. The heated components with their mechanically cleaned surfaces are reduced 10 to 35 percent by pressure such as by rolling or forging, uniting their mechanically clean surfaces to form the single or double clad composite. The reduction of the composite should preferably be carried out in a single heating with a minimum number of passes. In the case of a 4-ply assembly or coil the edges are trimmed and separated. No separating compound is needed to keep the stainless steel cladding from bonding because of the tenuous oxide of the stainless steel surface, which was not cleaned mechanically. Diffusion of the stainless into the other cladding of stainless will not occur at such low temperatures.

The same practice has been followed using aluminum alloys and stainless steel in the ferritic and in the martensitic state. I have used aluminum and aluminum alloys in both the annealed or cold worked state with equal success. Preferably, I clean the surfaces of both the aluminum and the stainless by a wire brushing or abrasive belt operation. However, the cleaning operation may be accomplished by any operation which will remove all of the oxides of the surfaces particularly of the aluminum which are to be bonded. This cleaning must be accomplished without imparting any grit, abrasive or chips so that a perfectly clean, oxide-free surface is provided. This is necessary in order to expose the pure, clean molecular, grain or lattice structure of the metal.

As will be seen from the foregoing example, the cleaned surfaces are immediately bonded together and subjected to a high degree of vacuum or a non-oxidizing or inert atmosphere such as argon, helium, hydrogen, nitrogen, lithium or the like, prior to and during the heating and pressure treating steps. The cleaned aluminum and stainless in contact with one another in the desired vacuum or non-oxidizing atmosphere are heated to a temperature at least as high as the recrystallization temperature of the aluminum but below the melting point of the aluminum and below the recrystallization temperature of the stainless steel and are then subjected to rolling, forging, pressing or any other metal forming operation such as explosives or atmospheric pressures.

I have found that the cleaned surfaces of the aluminum and stainless should preferably be brought together and into intimate contact prior to heating. This can be accomplished by cold rolling or cold pressing the materials together prior to heating. If a sufficiently intimate contact is achieved, a condition equivalent to a vacuum is created between the sheets and no evacuation or inert atmosphere is necessary at the heating step. The cold pressing operation creating its own non-oxidizing condition.

By properly cleaning the surfaces to remove the oxidized surface layer to expose new pure and clean grain or lattice structure and by heating and applying pressure to the metals at the temperatures set out hereinabove, it is possible to achieve a high strength bond which is free of a brittle non-ductile bond line which characterizes previous attempts to bond stainless to aluminum. Table 1 below illustrates the bond strength in shear:

*Table 1*

| Type | | Percent Clad | Shear Strength (p.s.i.) Av. |
|---|---|---|---|
| Stainless Steel | Aluminum | | |
| 302 | 3003 | 10 | 12,450 |
| 304 | 1100 | 20 | 9,125 |
| 304 | 3003 | 10 | 11,350 |
| 305 | 3003 | 20 | 13,350 |
| 430 | 1100 | 10 | 7,950 |

BOND STRENGTH IN SHEAR

The strength of the bond in shear could not be developed by the standard A.S.M.E. procedure set forth for stainless clad steel plate. This is due to the relative thicknesses of the components of stainless clad aluminum. It was found impractical to machine off the thin veneer of stainless steel and then place against a shear block for operation of the actual shear test. To accomplish the same data it was found necessary to machine or remove the aluminum from the stainless steel on one end and side only of the typical tensile specimen which is roughly 8" to 10" long and necked down by machining to .500" cross section width. The aluminum was removed to give 1" of bonded surface as shown in the attached drawing to result in a ½" x 1" surface area that can be subject to shear. The tensile specimen is then mounted into a standard tensile testing machine and the actual pounds (p.s.i.) per square inch determined to cause separation between the dissimilar metals.

Table 2 shows the mechanical properties of stainless clad aluminum single and double armor as prepared by this invention.

*Table 2.—Typical mechanical properties*

| Type | | Gage | Yield Str. | Tensile Str. | Percent Elong. |
|---|---|---|---|---|---|
| Stainless Steel | Aluminum | | | | |
| 302 | 3003 | .125 | 16,200 | 21,200 | 26 |
| 304 | 3003 | .100 | 18,750 | 23,800 | 32.5 |
| 304 | 1100 | .106 | 17,800 | 23,600 | 24 |
| 304 | 3003 | .090 | 21,300 | 26,500 | 25 |
| 305 | 3003 | .097 | 19,200 | 24,100 | 21 |
| 305 | 3003 | .094 | 19,800 | 25,000 | 26 |
| 304 | 3003 | .075 | 23,300 | 31,400 | 34.5 |
| 304 | 3003 | .098 | 19,100 | 24,900 | 27 |
| 304 | 1100 | .100 | 18,600 | 23,100 | 35 |
| | | | 18,100 | 24,200 | 32.5 |
| 304 | 3003 | .077 | 21,500 | 28,600 | 30 |
| 304 | 3003 | .052 | 24,750 | 32,900 | 27 |
| | | | 26,700 | 31,400 | 28 |
| 304 | 3003 | .050 | 24,600 | 32,750 | 28.5 |
| 304 | 3003 | .091 | 23,760 | 34,000 | 18 |
| | | | 24,350 | 35,700 | 22 |
| 304 | 1100 | .050 | 18,210 | 25,200 | 27 |
| 430 | 3003 | .095 | 23,110 | 37,570 | 18 |

The high strengths which are achieved can be readily seen from these tables.

Figure 4:
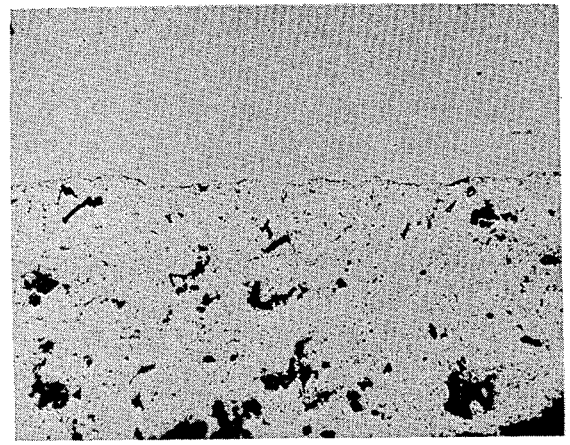
Figure 5:
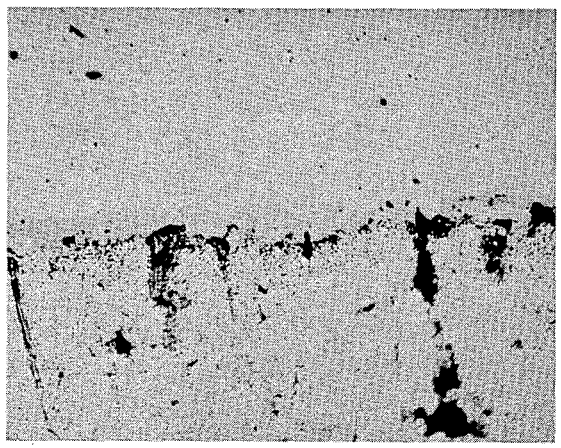

In FIGURES 4 and 5, I have illustrated photomicrographs of the stainless steel to aluminum bond according to the example set out hereinabove. The oxide-free junction between the dissimilar metals is clearly apparent as is the highly controlled diffusion of the aluminum into the stainless steel. This is particularly well illustrated in FIGURE 6 which is taken at a magnification of 1000 diameters.

In the foregoing description, I have set out a preferred practice and product of my invention. It will, however, be understood that this invention may be otherwise embodied within the scope of the following claims.

I claim:

1. The method of cladding aluminum with stainless steel which comprises removing by mechanical treatment substantially all oxide from the surfaces of the aluminum and stainless steel to be bonded, heating the metal surfaces to a temperature above the recrystallization temperature of aluminum but below the melting point of aluminum and below the recrystallization temperature of the stainless steel, and bringing the cleaned surfaces into contact with one another under pressure sufficient to effect a simultaneous reduction up to 35% in each of the metals, urging them together to unite the surfaces into a diffusion bond.

2. The method of cladding aluminum with stainless steel which comprises removing by mechanical treatment substantially all oxide from the surfaces of the aluminum and stainless steel which are to be bonded, heating the metal surfaces under non-oxidizing conditions to a temperature above the recrystallization temperature of aluminum but below the melting point of aluminum and below the recrystallization temperature of the stainless steel, and bringing the cleaned surfaces into contact with one another, and applying pressure sufficient to effect a simultaneous reduction up to 35% in each of the metals, urging them together to unite the surfaces into a diffusion bond.

3. The method of cladding aluminum with stainless steel which comprises removing by mechanical treatment substantially all oxide from the surfaces of the aluminum and stainless steel which are to be bonded, heating the metal surfaces in an inert atmosphere to a temperature above the recrystallization temperature of aluminum but below the melting point of aluminum and below the recrystallization temperature of the stainless steel, bringing the cleaned surfaces into contact with one another, and applying pressure sufficient to effect a simultaneous reduction up to 35% in each of the metals, urging them together to unite the surfaces into a diffusion bond.

4. The method of cladding aluminum with stainless steel which comprises removing by mechanical treatment substantially all oxide from the surfaces of the aluminum and stainless steel to be bonded, heating the metal surfaces to a temperature between approximately 650° F. and 1100° F., bringing the cleaned surfaces into contact with one another, and applying pressure sufficient to effect a simultaneous reduction up to 35% in each of the metals urging them together to unite the surfaces into a diffusion bond.

5. The method of cladding aluminum with stainless steel which comprises removing by mechanical treatment all oxide from the surfaces of the aluminum and stainless steel to be bonded, bringing the cleaned surfaces into contact with one another, heating the metal surfaces to a temperature above the recrystallization temperature of aluminum but below the melting point of aluminum and below the recrystallization temperature of the stainless steel and applying sufficient pressure simultaneously to effect a substantially equal reduction in the stainless steel and aluminum to unite the surfaces in a diffusion bond.

6. A method as claimed in claim 1 wherein the simultaneous reduction is approximately 10% to 35%.

7. A method as claimed in claim 2 wherein the non-oxidizing condition is a vacuum or reducing atmosphere.

8. A method as claimed in claim 1 wherein the mechanical treatment is wire brushing or abrading of the surfaces of the aluminum and stainless steel.

References Cited by the Examiner
UNITED STATES PATENTS

| | | | |
|---|---|---|---|
| 2,607,983 | 8/52 | McBride | 29—196.2 |
| 2,627,110 | 2/53 | Hickey | 29—494 |
| 2,691,815 | 10/54 | Boessenkool. | |
| 2,723,449 | 11/55 | Miller | 29—494 |
| 2,773,302 | 12/56 | Watson | 29—196.2 X |
| 2,782,498 | 2/57 | Mushovic | 29—498 |
| 2,837,818 | 6/58 | Storcheim | 29—197 |
| 2,879,587 | 3/59 | Mushovic | 29—197 X |
| 2,883,739 | 4/59 | Russell | 29—196.2 |
| 2,908,073 | 10/59 | Dulin | 29—197 X |

DAVID L. RECK, *Primary Examiner.*

HYLAND BIZOT, *Examiner.*